US008901846B2

(12) United States Patent
Routledge (10) Patent No.: US 8,901,846 B2
(45) Date of Patent: Dec. 2, 2014

(54) METHOD AND APPARATUS FOR MULTI-ZONED ILLUMINATION (75) Inventor: Gordon Routledge, North Yorkshire (GB)

(73) Assignee: Dialight Corporation, Farmingdale, NJ (US)

(*) Notice: Subject to any disclaimer, the term of this patent is extended or adjusted under 35 U.S.C. 154(b) by 0 days.

(21) Appl. No.: 13/318,059

(22) PCT Filed: Apr. 28, 2009

(86) PCT No.: PCT/GB2009/050437
§ 371 (c)(1),
(2), (4) Date: Oct. 28, 2011

(87) PCT Pub. No.: WO2010/125325
PCT Pub. Date: Nov. 4, 2010

(65) Prior Publication Data
US 2012/0039613 A1 Feb. 16, 2012

(51) Int. Cl.
*H05B 37/02* (2006.01)
(52) U.S. Cl.
CPC ........ *H05B 37/0245* (2013.01); *H05B 37/0227* (2013.01); *Y02B 20/72* (2013.01)
USPC ............................ 315/291; 315/307; 315/312
(58) Field of Classification Search
USPC ............ 315/DIG. 4, 291, 307, 224, 316, 324, 315/362
See application file for complete search history.

(56) References Cited

U.S. PATENT DOCUMENTS

| 3,944,723 | A | | 3/1976 | Fong |
| 4,580,099 | A | | 4/1986 | Zetti |
| 4,924,151 | A | | 5/1990 | D'Aleo et al. |
| 5,095,502 | A | | 3/1992 | Finzel |
| 5,471,201 | A | | 11/1995 | Cerami et al. |
| 5,811,975 | A | | 9/1998 | Bernardo |
| 5,923,269 | A | | 7/1999 | Shuey et al. |
| 5,962,991 | A | | 10/1999 | Levy |
| 6,046,550 | A | * | 4/2000 | Ference et al. ................. 315/291 |
| 6,489,733 | B1 | | 12/2002 | Schmidt et al. |
| 7,471,051 | B1 | | 12/2008 | Wacknov et al. |

(Continued)

FOREIGN PATENT DOCUMENTS

| JP | 10234142 A | 9/1998 |
| WO | WO 2009124453 A1 | 10/2009 |
| WO | WO 2010101370 A2 | 9/2010 |
| WO | WO 2010/125325 A1 | 11/2010 |

OTHER PUBLICATIONS

International Search Report and Written Opinion for PCT/GB2009/050437, Feb. 3, 2010, copy consists of 9 pages.

(Continued)

*Primary Examiner* — Thienvu Tran
*Assistant Examiner* — Christopher Lo (57) ABSTRACT

The present invention is directed to a multi-zoned lighting apparatus. In one embodiment, the multi-zoned lighting apparatus includes at least one circuit board, at least one control circuit coupled to the at least one circuit board and a plurality of light emitting diode (LED) groups coupled to the at least one control circuit, wherein each LED group of the plurality of LED groups is in communication with a respective external sensor that controls a respective one of the plurality of LED groups when triggered.

14 Claims, 11 Drawing Sheets

(56) References Cited

U.S. PATENT DOCUMENTS

| | | |
|---|---|---|
| 7,546,168 B2 | 6/2009 | Walters et al. |
| 7,769,149 B2 | 8/2010 | Berkman |
| 7,791,492 B2 | 9/2010 | Nam et al. |
| 7,817,063 B2 | 10/2010 | Hawkins et al. |
| 7,825,793 B1 | 11/2010 | Spillman et al. |
| 7,889,094 B2 | 2/2011 | Gilbert et al. |
| 8,242,887 B2 | 8/2012 | Cornwall et al. |
| 8,598,986 B2 | 12/2013 | Ahmad |
| 2003/0041107 A1 | 2/2003 | Blattner et al. |
| 2004/0105264 A1 | 6/2004 | Spero |
| 2004/0189722 A1 | 9/2004 | Acres |
| 2005/0174473 A1* | 8/2005 | Morgan et al. ............. 348/370 |
| 2005/0238044 A1 | 10/2005 | Osterloh et al. |
| 2006/0023853 A1 | 2/2006 | Shelley et al. |
| 2006/0044158 A1 | 3/2006 | Womble et al. |
| 2006/0076908 A1* | 4/2006 | Morgan et al. ............. 315/312 |
| 2006/0202864 A1 | 9/2006 | Pirschel |
| 2007/0165835 A1 | 7/2007 | Berkman |
| 2007/0200553 A1 | 8/2007 | Morrison |
| 2007/0252722 A1 | 11/2007 | Zigdon et al. |
| 2008/0051036 A1 | 2/2008 | Vaswani et al. |
| 2008/0052253 A1 | 2/2008 | Edwards et al. |
| 2008/0074284 A1 | 3/2008 | Edwards et al. |
| 2008/0074289 A1 | 3/2008 | Sauder et al. |
| 2008/0143493 A1 | 6/2008 | Nam et al. |
| 2008/0191897 A1 | 8/2008 | McCollough |
| 2009/0135836 A1 | 5/2009 | Veillette |
| 2009/0153357 A1 | 6/2009 | Bushman et al. |
| 2009/0187284 A1 | 7/2009 | Kreiss et al. |
| 2009/0271045 A1 | 10/2009 | Savelle et al. |
| 2009/0303703 A1 | 12/2009 | Kao et al. |
| 2009/0309749 A1 | 12/2009 | Gilbert et al. |
| 2009/0312968 A1 | 12/2009 | Phillips |
| 2010/0141153 A1 | 6/2010 | Recker et al. |
| 2010/0164386 A1 | 7/2010 | You |
| 2010/0222932 A1 | 9/2010 | O'Connor |
| 2010/0231131 A1 | 9/2010 | Anderson |
| 2011/0001626 A1 | 1/2011 | Yip et al. |
| 2011/0004764 A1 | 1/2011 | Stuber |
| 2011/0053492 A1 | 3/2011 | Hochstein |
| 2011/0066297 A1 | 3/2011 | Saberi et al. |
| 2011/0103274 A1 | 5/2011 | Vavik |

OTHER PUBLICATIONS

Office Action from CA Application No. 2,701,974, Sep. 20, 2012, copy consists of 4 pages.

Office Action from CA 2,701,974, dated May 10, 2013, copy consists of 2 unnumbered pages.

Office Action from CA 2,760,380, dated Dec. 13, 2012, copy consists of 2 unnumbered pages.

EP Examination Report Application No. 09 785 218.0, Jul. 8, 2013, copy consists of 10 pages.

Office Action from CA Application No. 2,762,796, Oct. 31, 2013, copy consists of 2 pages.

Office Action in corresponding Canadian Application No. 2,760,380, dated Jul. 17, 2014, pp. 1-2.

\* cited by examiner

METHOD AND APPARATUS FOR MULTI-ZONED ILLUMINATION

CROSS REFERENCE TO RELATED APPLICATIONS

This application is a 371 of International Application No. PCT/GB2009/050437, filed Apr. 28, 2009, entitled" METHOD AND APPARATUS FOR MULTI-ZONED ILLUMINATION" which prior application is incorporated herein by reference.

This application is related to co-pending U.S. patent application Ser. No. 12/431,326, filed on Apr. 28, 2009, entitled, "REMOTE MONITORING AND CONTROL OF LED BASED STREET LIGHTS," the contents of each of the above-referenced applications is incorporated herein by reference.

FIELD OF THE INVENTION

The present invention is directed to a lighting apparatus and more specifically to a single lighting apparatus having a plurality of LED groups for multi-zoned LED based illumination.

BACKGROUND OF THE INVENTION

Current exterior lighting, such as for example street lights, using fluorescent tubes or mercury metal is inefficient and has several drawbacks. They generally consume more power and have a relatively short life. One alternative approach is to replace these light sources with light emitting diode (LED) based exterior lighting.

However, current LED based solutions use multiple LEDs to provide a required amount of lumens to illuminate a surface. Moreover, the LEDs are not independently controllable. That is, all of the LEDs must be adjusted at the same time.

SUMMARY OF THE INVENTION

The present invention is directed to a multi-zoned lighting apparatus. In one embodiment, the multi-zoned lighting apparatus includes at least one circuit board, at least one control circuit coupled to said at least one circuit board and a plurality of light emitting diode (LED) groups coupled to said at least one control circuit, wherein each LED group of said plurality of LED groups is in communication with a respective external sensor that controls a respective one of said plurality of LED groups when triggered.

In one embodiment, the present invention provides method for providing multi-zoned illumination using a single lighting apparatus. The method comprises powering said single lighting apparatus having a plurality of light emitting diode (LED) groups, each one of said plurality of LED groups having at least one LED and controlling each one of said plurality of LED groups independently of one another via a respective external sensor that controls a respective one of said plurality of LED groups when triggered.

In one embodiment, the present invention provides a system for providing multiple points of multi-zoned illumination. The system comprises a plurality of lighting apparatuses, at least one sensor coupled to each one of said plurality of lighting apparatuses and a central controller in communication with said plurality of lighting apparatuses. Each one of the plurality of lighting apparatuses comprises a plurality of light emitting diode (LED) groups, wherein each LED group of said plurality of LED groups is independently controlled and at least one LED coupled to each one of said plurality of LED groups.

BRIEF DESCRIPTION OF THE DRAWINGS

So that the manner in which the above recited features of the present invention can be understood in detail, a more particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the present invention resolve the above noted problems associated with previously used lighting apparatuses for exterior lighting. For example, in one embodiment, the present invention uses a single light emitting diode (LED) based lighting apparatus having a plurality of independently controlled LED groups for multi-zoned illumination. Thus, the present invention provides a more efficient and cost effective option for exterior lighting. For example, various LED groups may be turned off or dimmed to a low setting until a person or object (e.g., a automobile, motorcycle and the like) is detected. Then, only a LED group associated with the zone that detected the person or object may be activated. Thus, costs savings is achieved by only powering up particular LED groups in the single lighting apparatus on an "as-needed" basis.

Figure 1:
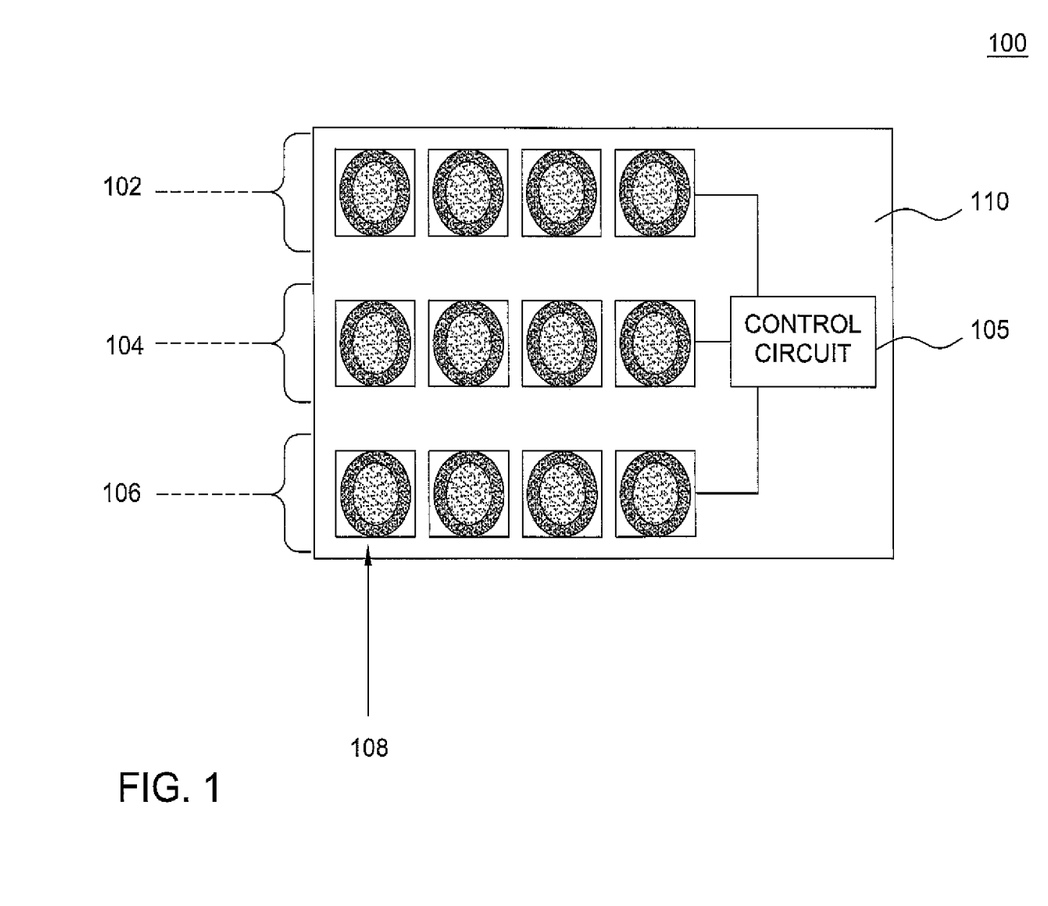
FIG. 1 depicts one embodiment of a single lighting apparatus having a plurality of LED groups.

FIG. 1 illustrates one embodiment of a lighting apparatus 100 of the present invention. The lighting apparatus comprises a plurality of LED groups 102, 104 and 106. Each of the plurality of LED groups 102, 104 and 106 may be coupled to at least one control circuit 105 on a single circuit board 110 or may be coupled to separate circuit boards 110. In one embodiment, the control circuit 105 may comprise a controller (e.g., a central processing unit (CPU) and associated computer readable mediums, e.g., RAM, ROM, hard disk drive, floppy disk and the like for storing instructions) and one or more switches for controlling the LED groups 102, 104 and 106 independently. Alternatively, the control circuit 105 may comprise ancillary devices such as wiring, resistors, capacitors, inductors, gates and the like designed and implemented to control each of the plurality of LED groups 102, 104 and 106 independently. Those skilled in the art will recognize that any type of circuit design may be used to independently control the plurality of LED groups 102, 104 and 106 independently.

Figure 7:
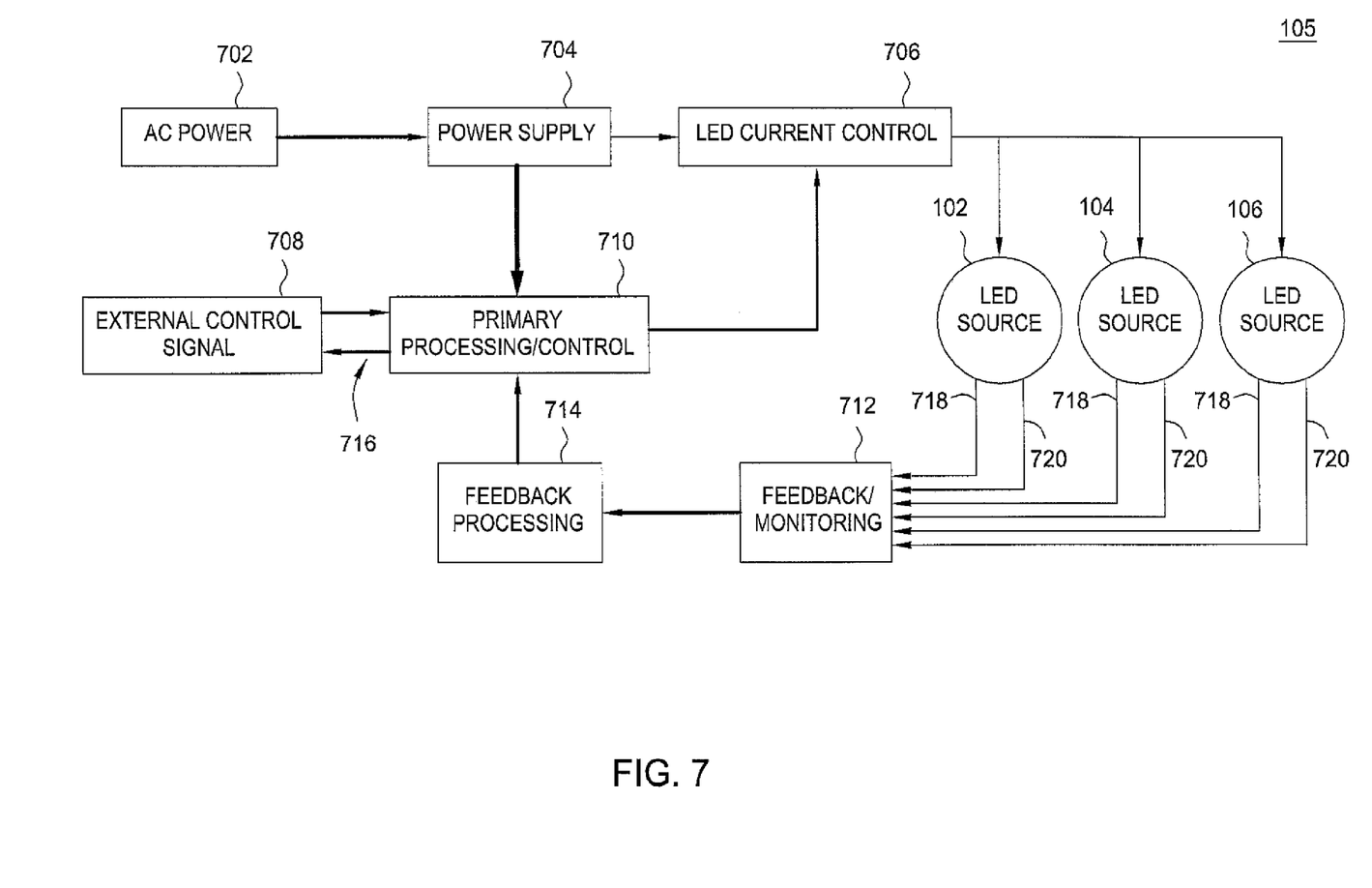
FIG. 7 depicts a block diagram of one example of a control circuit for the single lighting apparatus having a plurality of LED groups.
Figure 8A:
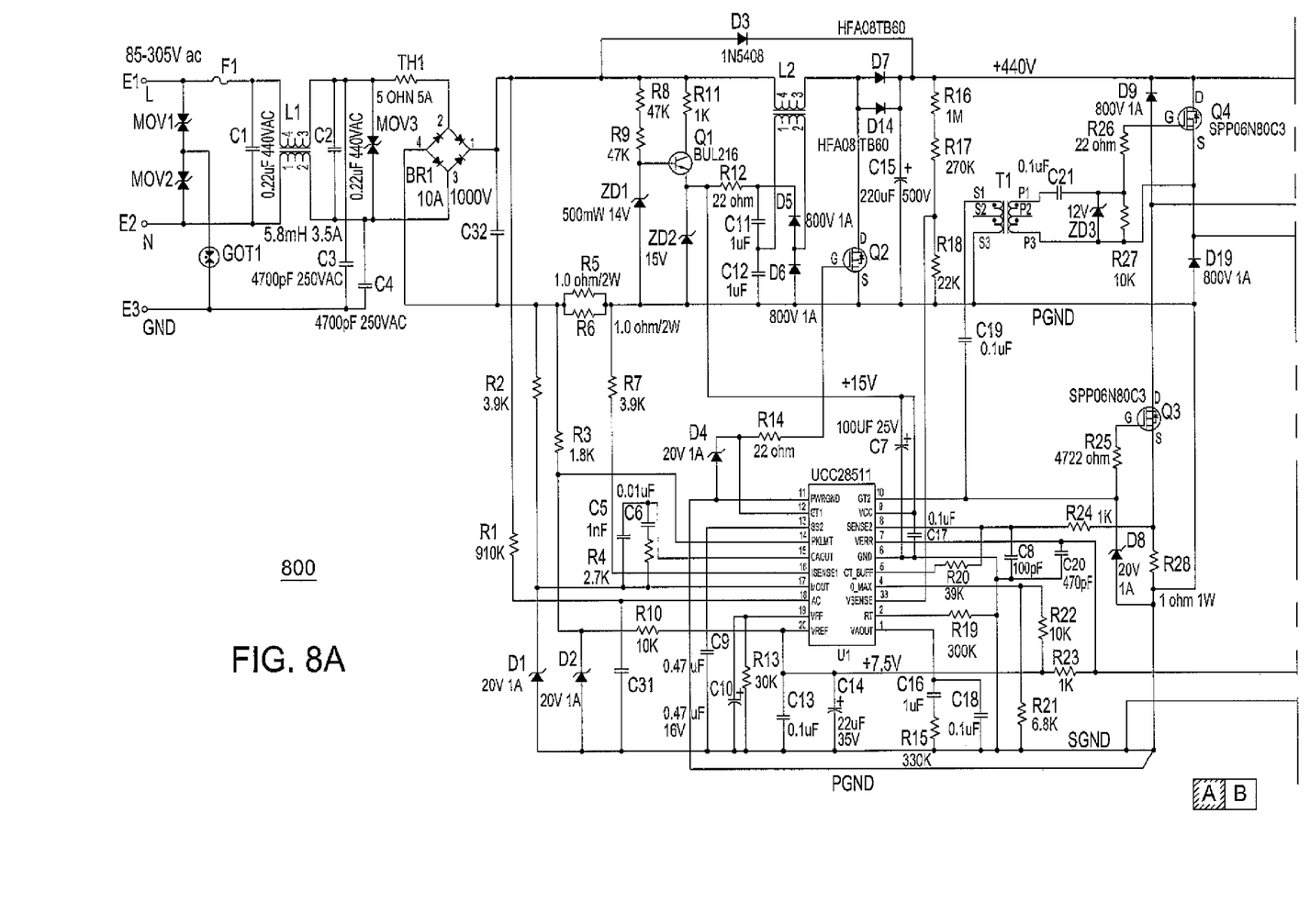
FIGS. 8A and 8B depict a circuit diagram of one example of the control circuit.
Figure 8B:
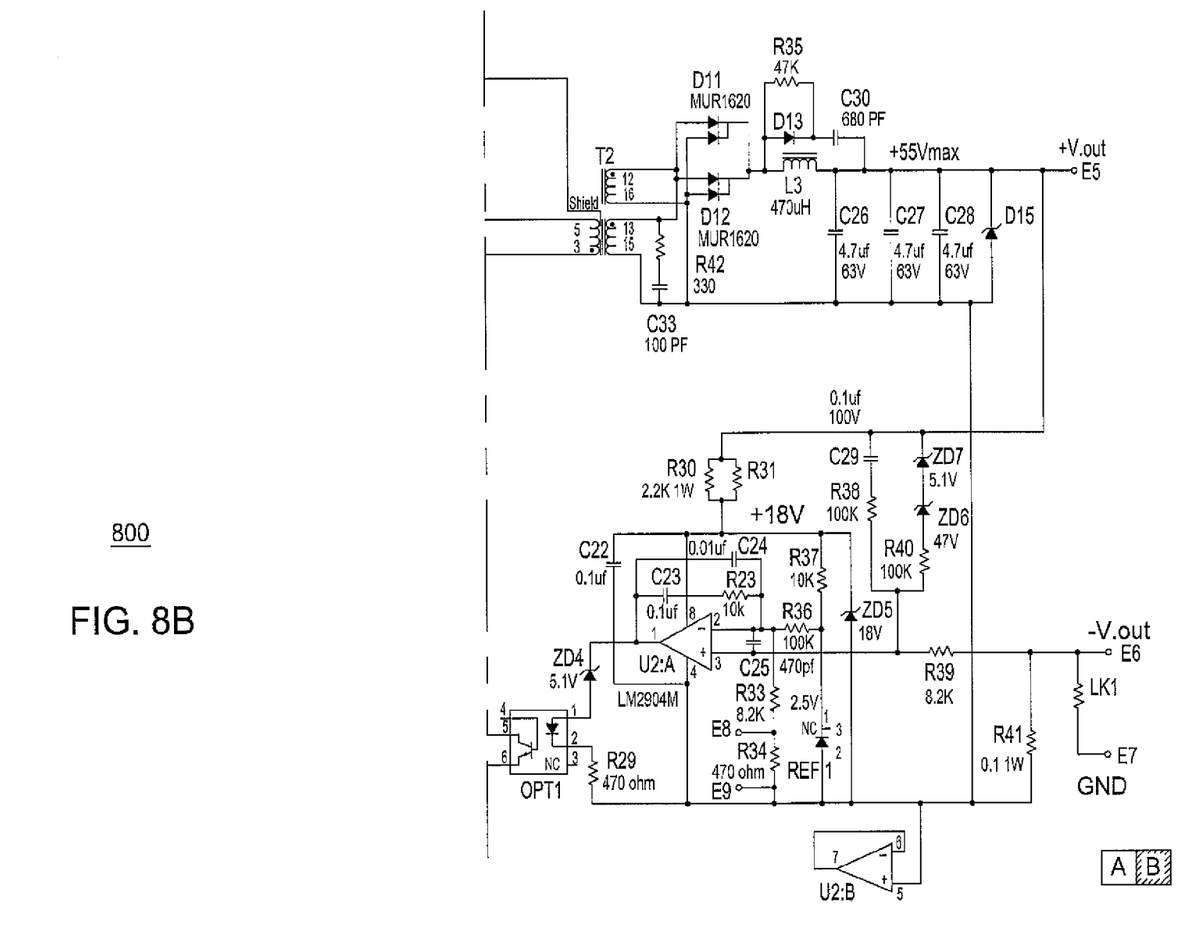

FIG. 7 illustrates a block diagram of one example of a control circuit 105. The control circuit 105 may include a power source 702, a power supply 704, a LED current control 706, an external control signal module 708, a primary processing and control module 710, a feedback and monitoring module 712 and a feedback processing module 714. The LED current control 706 may be coupled to each one of the plurality of LED groups 102, 104 and 106. The feedback and monitoring module 712 may monitor various data via circuits 718 and 720 from each of the LED groups 102, 104 and 106. For example circuits 718 may provide LED temperature information and circuits 720 may provide current information.

In one embodiment, the external control signal module 708 and the primary processing and control module 710 and the external control signal module 708 may communicate with one another via two way communications represented by arrows 716. The external control signal module may be, for example, an external sensor as discussed below with respect to FIG. 5. One exemplary detailed circuit diagram of the above control circuit 105 is illustrated by circuit 800 in FIG. 8.

Referring back to FIG. 1, each one of the plurality of LED groups 102, 104 and 106 may include at least one LED 108. In one embodiment, the LED 108 may be any type of LED 108 that has enough light output to illuminate an outdoor area. For example, the LED 108 may provide illuminance (lux) of at least 10 lumens per square meter or luminance (cd/m$^2$) of at least 1 candela per square meter.

FIG. 1 illustrates that LED group 102 has 4 LEDs 108, LED group 104 has 4 LEDs 108 and that LED group 106 has 4 LEDs 108. Those skilled in the art will recognize that any number of LEDs 108 may be included in each LED group and the present invention is not limited to any specific number of LEDs 108. In addition, although only three LED groups 102, 104 and 106 are illustrated in FIG. 1, those skilled in the art will recognize that any number of LED groups may be used.

In one embodiment, each one of the plurality of LED groups 102, 104 and 106 may be independently controlled. That is, an illumination level of the LED 108 of any one of the LED groups 102, 104 or 106 may be adjusted without adjusting an illumination level of the other LED groups. For example, the illumination level of the LEDs 108 on LED group 102 may be adjusted without adjusting the illumination level of the LEDs 108 on the remaining LED groups 104 and 106. Illumination level may be defined herein as including on (ie, fully on), off and any gradation of illumination between on and off.

Notably, the plurality of LED groups 102, 104 and 106 are included in a single lighting apparatus 100. Thus, only a single lighting apparatus 100 needs to be powered to independently control three different LED groups 102, 104 and 106 as opposed to installing, and separately powering, three separate light fixtures to illuminate three different zones. In addition, during installation, only a single lighting apparatus 100 needs to be installed, thus saving time and labor costs for installation.

Figure 2:
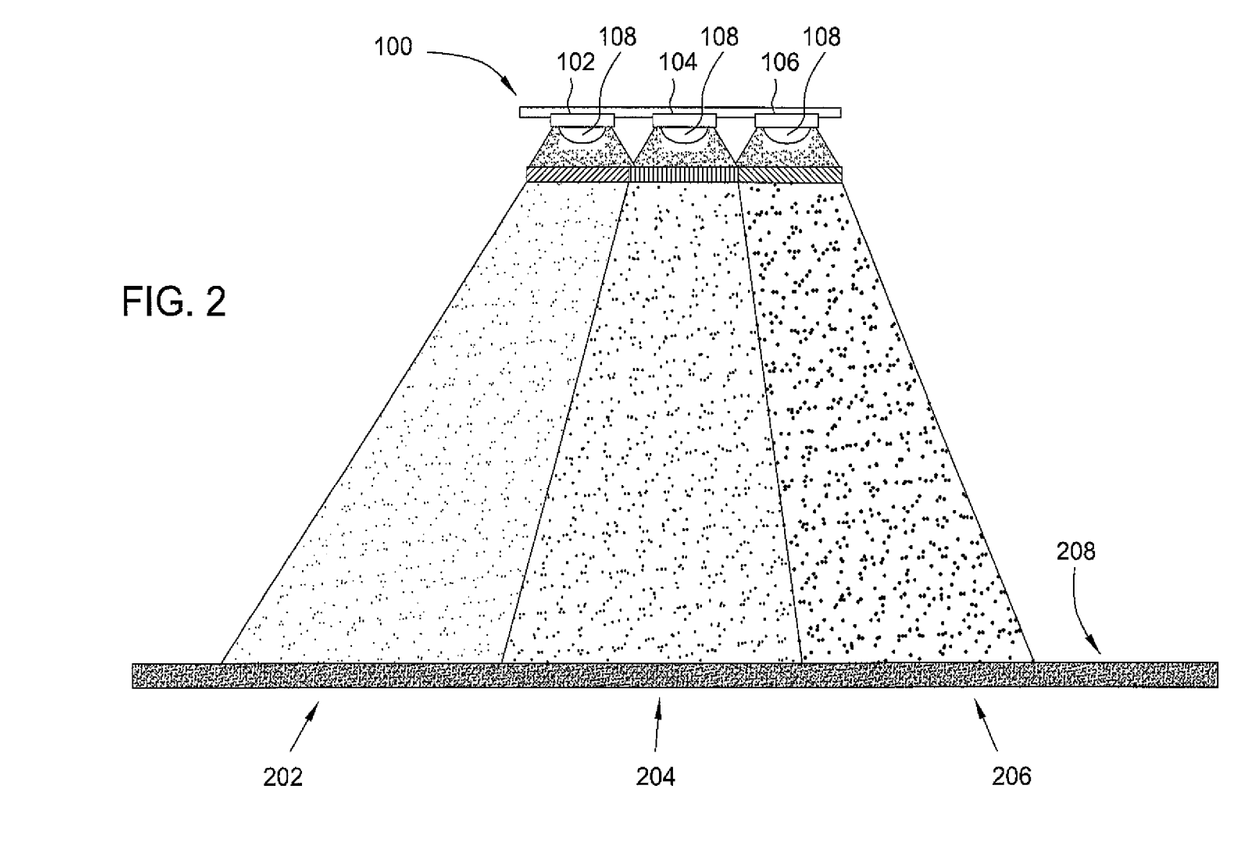
FIG. 2 depicts one embodiment of the single lighting apparatus used to illuminate different zones.

The ability to independently control the plurality of LED groups 102, 104 and 106 may be advantageously used to illuminate different zones. FIG. 2 illustrates one embodiment of how the lighting apparatus 100 may be used to illuminate different zones 202, 204 and 206 of a surface 208.

Each one of the LED groups 102, 104 and 106 may be associated with a different zone 202, 204 and 206. For example, the LEDs 108 in LED group 102 may be positioned or configured such that when LED group 102 is activated only zone 202 is illuminated. Accordingly, the LEDs 108 in LED group 104 may be positioned or configured such that when LED group 104 is activated only zone 204 is illuminated. The LEDs 108 in the LED group 106 may be similarly arranged such that only zone 206 is illuminated when LED group 106 is activated.

Notably, light emitted from the LEDs 108 of each one of the plurality of LED groups 102, 104 and 106 are emitted at a different angle or a different direction. That is, light emitted from LEDs 108 of LED group 102 are emitted at a different angle than light emitted from LEDs 108 of LED groups 104 and 106, respectively. There may be some overlap between the illumination zones, however a majority of the peak illumination of the LEDs 108 of each one of the LED groups 102, 104 and 106 falls within their respective zones, 202, 204 and 206. Said another way, in one embodiment, the light emitted from the LEDs 108 of each one of the plurality of LED groups 102, 104 and 106 are not in a parallel direction.

In one embodiment, rather than positioning each one of the LEDs 108 to face in a different direction to illuminate a respective zone 202, 204 and 206, the LEDs 108 of each one of the plurality LED groups 102, 104 and 106 may all face the same direction and an optical component may be coupled to the LEDs 108 to re-direct the light emitted from the LEDs 108 in different angles or in different directions. This is illustrated as one embodiment in FIG. 3.

Figure 3:
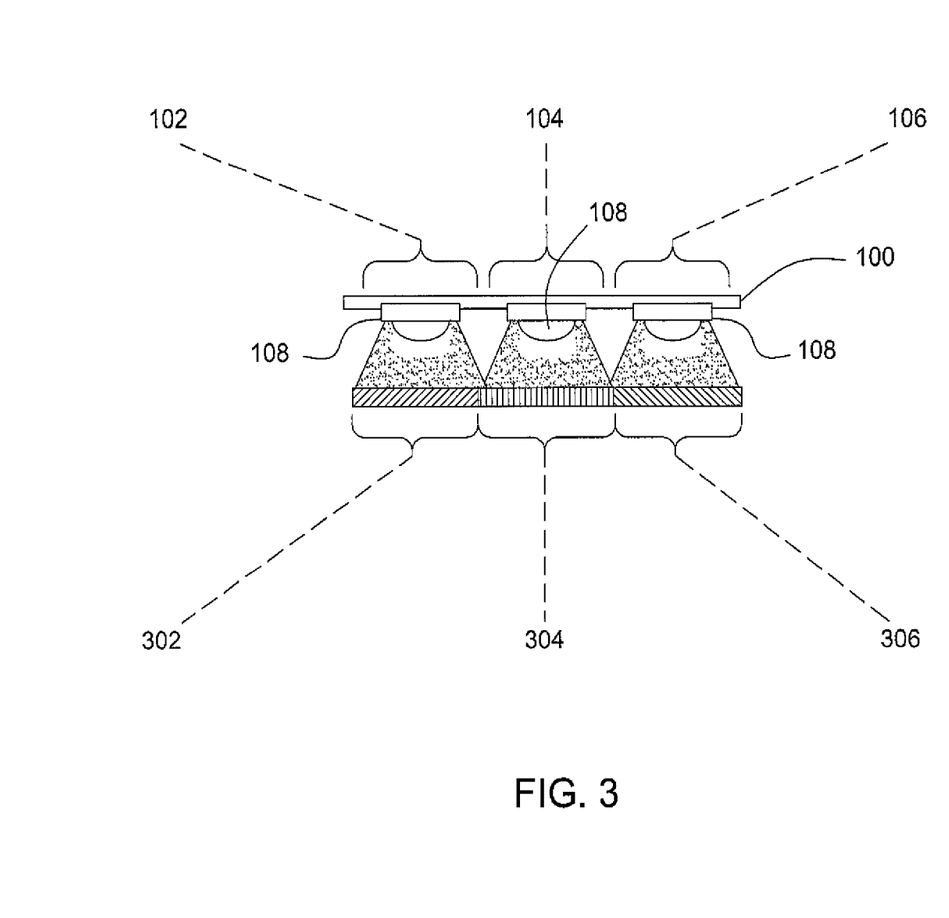
FIG. 3 depicts one embodiment of the single lighting apparatus having different optical components fitted to the light emitting diodes (LEDs)

FIG. 3 illustrates one embodiment of the light apparatus 100 having LEDs 108 fitted with optical components 302, 304 and 306. The optical components 302, 304 and 306 may be a lens or a reflector. The optical components may be designed to move light output by the LEDs 108 or a LED group 102, 104 or 106 in a desired direction. In addition, the optical components 302, 304 and 306 may be the same for each of the LEDs 108 or each of the LED groups 102, 104 and 106 or may be different for each of the LEDs 108 or each of the LED groups 102, 104 and 106. For example, each one of the LEDs 108 in LED group 102 may be fitted with a first optical component 302. Each one of the LEDs 108 in LED group 104 may be fitted with a second optical component 304. Each one of the LEDs 108 in LED group 106 may be fitted with a third optical component 306.

In an alternative embodiment, a first optical component 302 may be coupled to the circuit board 110 of the LED group 102. In other words, a single first optical component 302 may be used to cover all of the LEDs 108 of the LED group 102, rather than individually coupling the first optical component 302 to each one of the LEDs 108 of the LED group 102. Similar configurations may be made with the second optical component 304 and the LEDs 108 of the LED group 104 and the third optical component 306 and the LEDs 108 of the LED group 106.

Thus, when the lighting apparatus 100 is manufactured, all of the LEDs 108 may be placed facing the same direction. Then using the optical components 302, 304 and 306, light emitted from the LEDs 108 may be re-directed to illuminate a particular zone associated with a respective LED group 102, 104 or 106. For example, referring back to FIG. 2, the first optical component 302 may be used to re-direct light emitted from LEDs 108 in the LED group 102 towards zone 202. The second optical component 304 and the third optical components 306 may function similarly to illuminate zones 204 and 206, respectively.

In one embodiment, external sensors (not shown) may be deployed to activate a particular LED group when the sensor is triggered. A sensor may be remotely deployed in each illumination zone and be in communication with one of the plurality of LED groups 102, 104 and 106. The sensor may be either wirelessly in communication with or directly wired to one of the plurality of LED groups 102, 104 and 106. Any type of sensor may be used to detect motion or the presence of a person or physical object such as, for example, a motion sensor, an induction loop, RADAR, a proximity sensor, an acoustic sensor, a pressure sensor and the like.

Figure 4A:
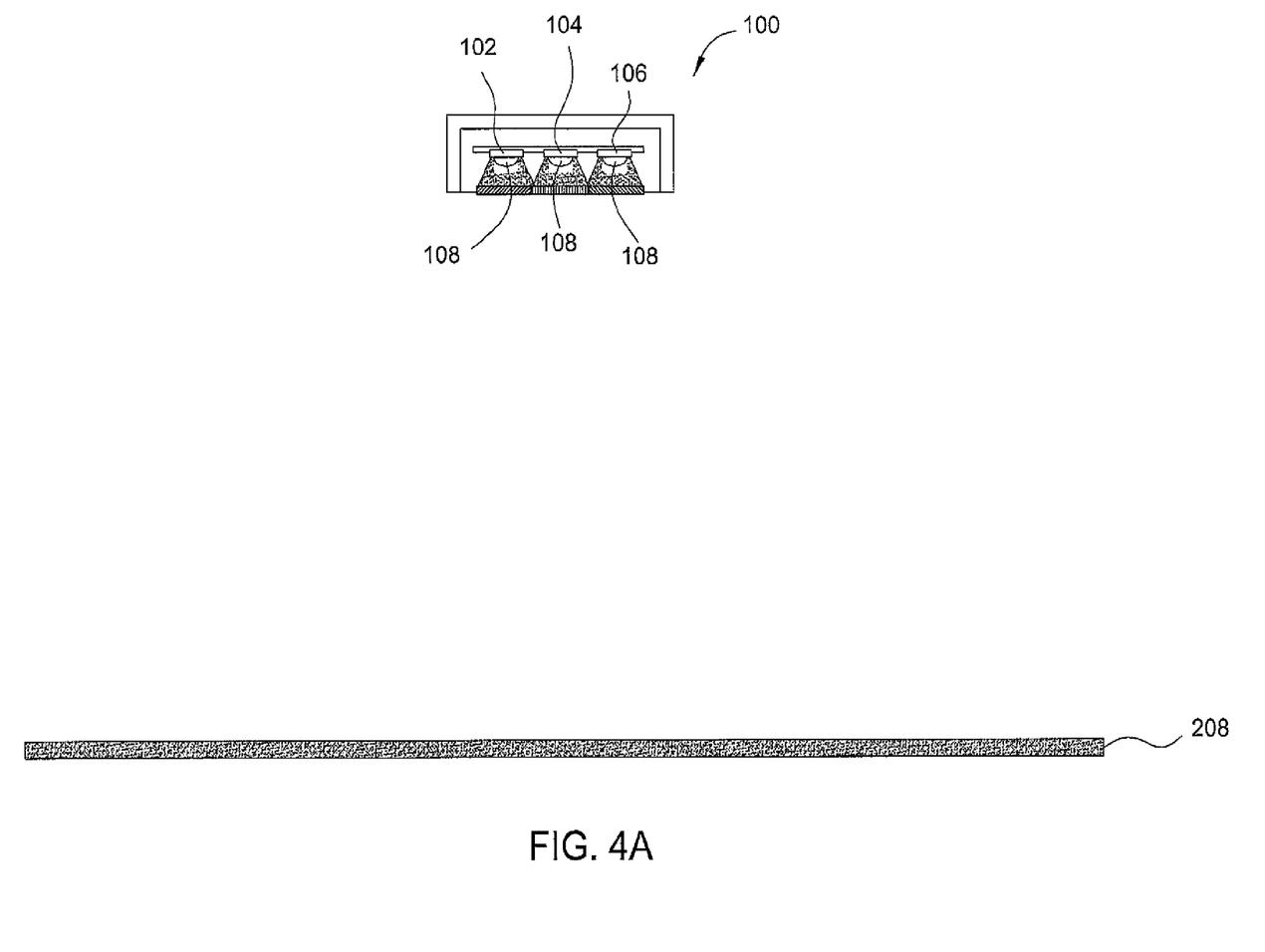
FIG. 4a depicts one embodiment of the single light apparatus when all illumination zones are off.
Figure 4B:
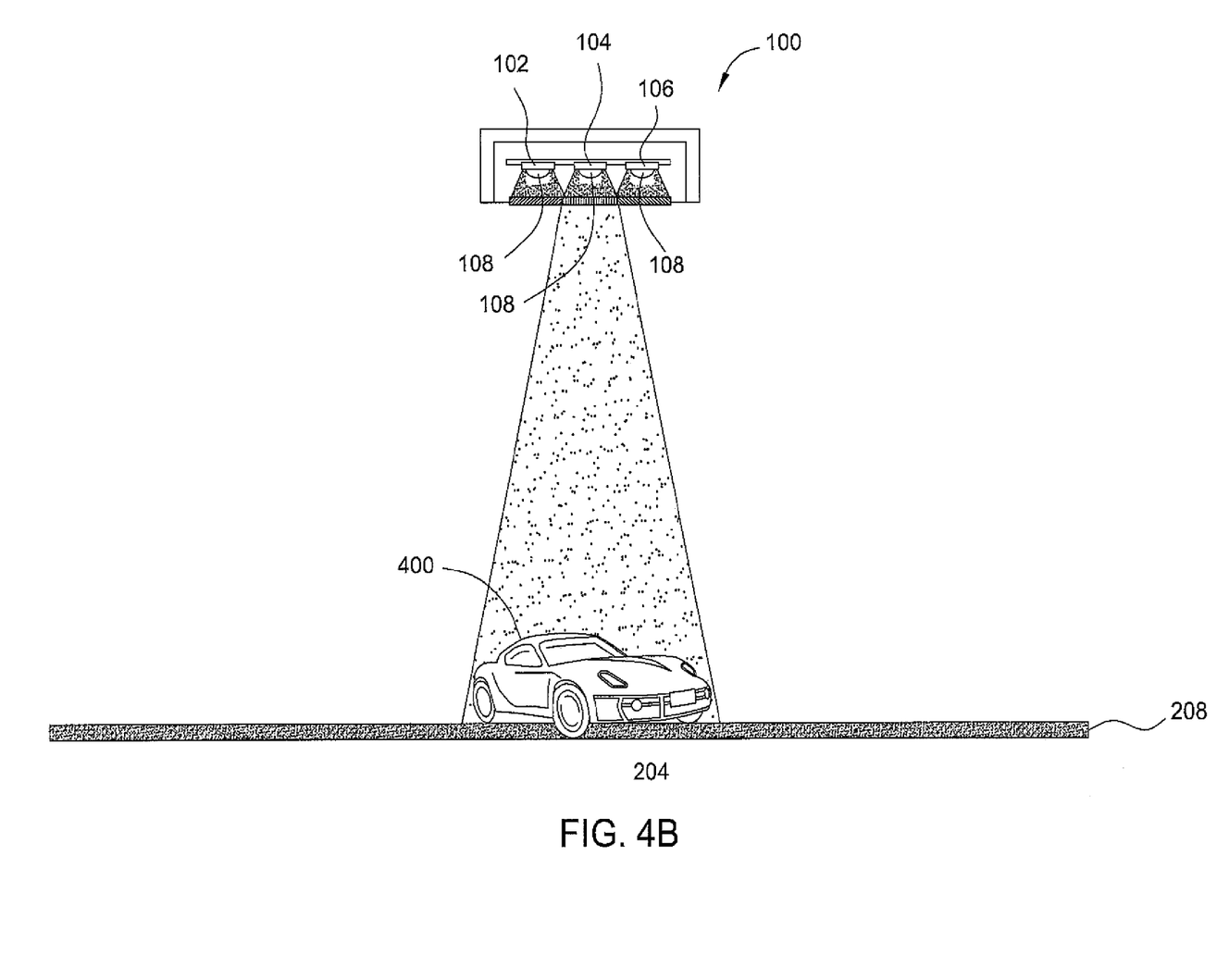
FIG. 4b depicts one embodiment of the single light apparatus when a first sensor is triggered.
Figure 4C:
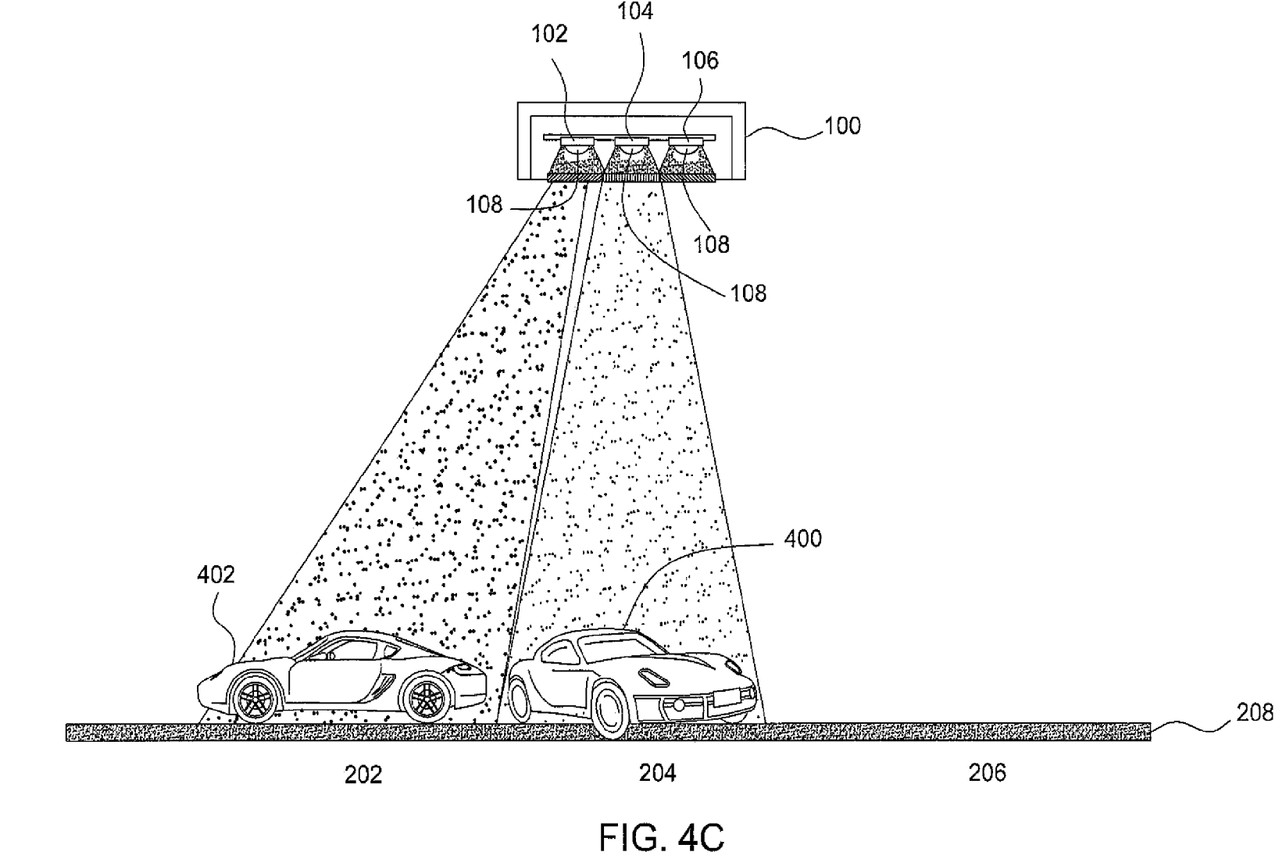
FIG. 4c depicts one embodiment of the single light apparatus when a second sensor is triggered.

FIGS. 4a-4c illustrate one embodiment of how sensors may be used to activate a particular LED group 102, 104 or 106 for multi-zoned illumination. FIG. 4a illustrates one of many possible applications of the lighting apparatus 100. In FIG. 4a a parking garage is used as one possible application. The lighting apparatus 100 may be installed over the surface 208. As illustrated in FIG. 4a, no persons or objects are detected by the sensors (not shown). Consequently, all of the LEDs 108 of the respective ones of the plurality of LED groups 102, 104 and 106 are turned off or are dimmed to the lowest illumination level.

In FIG. 4b, a person or object 400 is detected in zone 204. For example, a person could be entering their parked car in zone 204 or a car could be approaching zone 204 in the parking garage. In any case, when the person or object 400 triggers a sensor in zone 204, the information may be communicated to a particular LED group in the lighting apparatus 100. Thus, a particular LED group associated with zone 204 may be activated. In the present example, the LED group 104 may be associated with the sensor in zone 204.

Thus, triggering the sensor associated with zone 204 activates the LED group 104. As a result, an illumination level of the LEDs 108 in the LED group 104 may be adjusted to illuminate zone 204. For example, if the LEDs 108 in the LED group 104 were off, the LEDs 108 in the LED group 104 may be turned on and adjusted to a desired or pre-determined illumination level.

In one embodiment, different illumination levels may be used depending on whether a person or a vehicle is detected in zone 204. For example, when a person is detected in zone 204, the LEDs 108 in the LED group 104 may be adjusted to a maximum illumination level. Alternatively, when a car is detected in zone 204, the LEDs 108 in the LED group 104 may be adjusted to a lower illumination for energy and cost savings as the car will typically have headlights and full illumination is not needed. In one embodiment, the sensor may distinguish the difference between a person and a car based upon a speed at which the object is moving or via image recognition methods. However, those skilled in the art will recognize that other methods may be used to differentiate between people and objects.

Notably, in FIG. 4b, while the illumination level of the LEDs 108 in the LED group 104 is adjusted, the remaining LED groups 102 and 106 remain unchanged. That is, the illumination level of the LEDs 108 in the LED group 104 is independently controlled with respect to the other LED groups 102 and 106.

Referring now to FIG. 4c, a second person or object 402 is detected in zone 202. For example, a car could be detected in zone 202 of the parking garage. When the person or object 402 triggers a sensor in zone 202, the information may be communicated to a particular LED group in the lighting apparatus 100. Thus, a particular LED group associated with zone 202 may be activated. In the present example, the LED group 102 may be associated with the sensor in zone 202.

Thus, triggering the sensor in zone 202 activates the LED group 102. As a result, an illumination level of the LEDs 108 in the LED group 102 may be adjusted to illuminate zone 202. For example, if the LEDs 108 in the LED group 102 were off, the LEDs 108 in the LED group 102 may be turned on and adjusted to a desired or pre-determined illumination level.

Notably, adjusting the illumination level of the LEDs 108 in the LED group 102 has no effect on the LEDs 108 in the LED groups 104 and 106, respectively. For example, the LEDs 108 in the LED group 104 remain illuminated while object 400 is still in zone 204. In addition, the LEDs 108 in the LED group 106 remain off or in the lowest illumination setting while no person or object is detected in zone 206. Moreover, the illumination level of the LED groups 102 and 104 may be different.

Although FIGS. 4a-4c are discussed with respect to using the lighting apparatus 100 in a parking garage, those skilled in the art will recognize that the lighting apparatus 100 may be used in other environments. For example, the lighting apparatus 100 may be used as street lighting or to light walkways. Thus, the environments discussed herein should only be viewed as examples and not be considered limiting the present invention.

Figure 5:
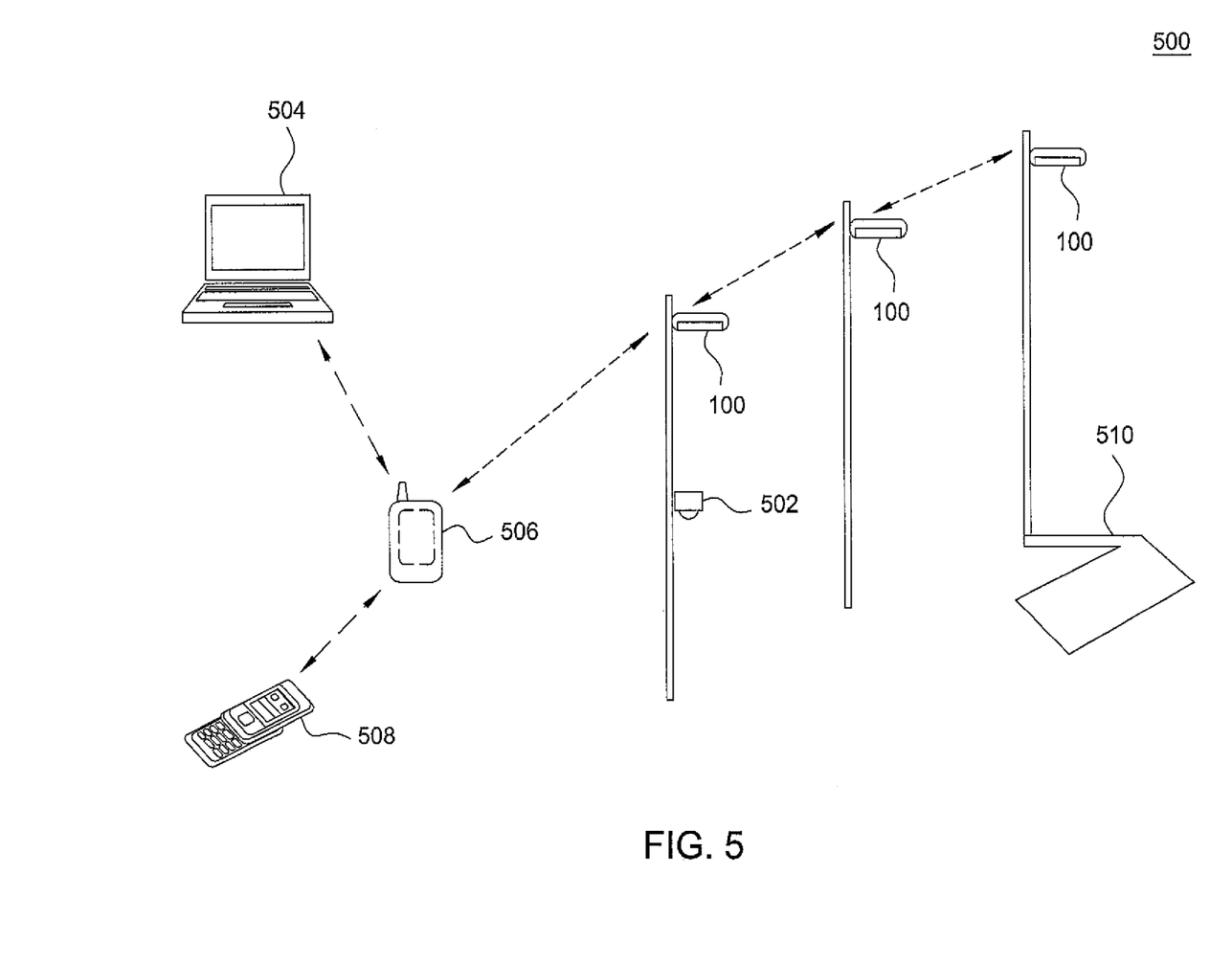
FIG. 5 depicts one embodiment of a system for providing multiple points of multi-zoned illumination.

The lighting apparatus 100 may be used with other lighting apparatuses 100 to form a more complicated system. FIG. 5 illustrates a system 500 for providing multiple points of multi-zoned illumination. For example, the system 500 illustrated in FIG. 5 may be utilized on a street with multiple lanes of traffic. Each one of the plurality of LED groups in the lighting apparatus 100 may be used to illuminate a single lane of traffic. A plurality of lighting apparatuses 100 may be situated along a street each having the plurality of LED groups to selectively illuminate lanes of traffic along a street as needed.

Each one of the plurality of lighting apparatuses 100 may each have one or more sensors 502. As discussed above, the sensor 502 may be an external sensor remotely located form a respective lighting apparatus 100 and in communication with the respective lighting apparatus 100. A sensor 502 may be placed in each lane and in communication with a respective one of the plurality of LED groups. Alternatively, an induction loop 510 may be used in each lane and in communication with a respective one of the plurality of LED groups. In yet another embodiment, a different type of sensor may be used in each lane.

When the sensor 502 or the induction loop 510 in a lane of the street senses a passing car, a LED group associated with the sensor 502 or induction loop 510 may be activated. Thus, LEDs associated with the activated LED group may illuminate the lane having the passing car, while the LEDs associated with the remaining LED groups in the unused lanes remain off or at a minimum illumination level. In one embodiment, the sensor 502 or the induction loop 510 may be placed a calculated distance before the lighting apparatuses 100 such that a first lighting apparatus 100 may have enough time to receive communications from the sensor 502 or the induction loop 510 and activate the LEDs of an appropriate LED group. For example, the distance may be based upon an average speed of cars using the street and the amount of time for the lighting apparatuses 100 to receive communications and activate the LEDs of an appropriate LED group.

Moreover, the plurality of lighting apparatuses 100 may be in communication with one another. In one embodiment, the plurality of lighting apparatuses 100 may communicate using radio frequency (RF) point-to-point communications. This may be used to communicate information between the plurality of lighting apparatuses 100 such that they may activate LEDs down the road for the particular lane as the car is moving.

To illustrate, a first sensor 502 or induction loop 510 detects a passing car, thereby activating LEDs of a particular LED group of a first lighting apparatus 100. Subsequently, the first lighting apparatus 100 may communicate with a second lighting apparatus 100 down the street informing it that a car is approaching. Thus, the second lighting apparatus 100 may activate a particular LED group associated with the same lane as illuminated by the particular LED group in the first lighting apparatus 100 in anticipation of the approaching car. This may then be repeated again by having the second lighting apparatus 100 send a communications to a third lighting apparatus 100 and so forth.

As a result, a sensor 502 or an induction loop 510 need not be placed with every one of the plurality of lighting apparatuses 100. For example, a sensor 502 or an induction loop 510 may be placed every 10 lighting apparatuses to ensure the car is still in the illuminated lane. However, if the car turns off of the street before the next sensor, then the subsequent plurality of lighting apparatuses 100 down the street would not be activated.

Other types of logic may be implemented to turn off the plurality of lighting apparatuses 100 after they are turned on. For example, if the first lighting apparatus 100 is turned on and the first sensor 502 does not detect a passing car within a predefined period of time, the lighting apparatus 100 may automatically turn off. Alternatively, if a second sensor (not shown) detects the passing car at a second lighting apparatus, then the second sensor may communicate back to the first lighting apparatus 100 to instruct the first lighting apparatus 100 to turn off. Those skilled in the art will recognize that any logic may be implemented to turn off the plurality of lighting apparatuses 100 after they are turned on.

The plurality of lighting apparatuses 100 may also be in communication with a remotely located central controller 504 via a hub 506. In one embodiment, the central controller 504 may comprise a processor element (e.g., a CPU), a memory, e.g., random access memory (RAM) and/or read only memory (ROM) and various input/output devices (e.g., computer readable mediums or storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

In one embodiment, the central controller 504 may communicate with the hub 506 via a global system for mobile (GSM) communications network. The hub 506 may communicate with the plurality of lighting apparatuses 100 via RF point-to-point communications.

In one embodiment a mobile node 508 may also be used to communicate with the plurality of lighting apparatuses 100 via the hub 506. For example, the mobile node 508 may communicate with the hub 506 via a short message service (SMS) protocol.

In one embodiment, the central controller 504 and/or the mobile node 508 may be used to monitor and/or control each one of the plurality of lighting apparatuses 100. For example, if maintenance needs to be performed on one of the plurality of lighting apparatuses 100, the central controller 504 may be used to temporarily disable the lighting apparatus 100. Alternatively, the central controller 504 may be used to ensure the plurality of lighting apparatuses 100 remain turned on if emergency personnel are present or there is an accident. The central controller 504 may also be used to collect information from each of the plurality of lighting apparatuses 100 such as life, power readings, status, error alarms, etc. Thus, the system 500 provides an integrated communications network of the plurality of lighting apparatuses 100.

In one embodiment, to prevent inadvertently triggering the sensors by animals or flying debris, one or more thresholds may be used by the sensors and the lighting apparatuses 100. For example, the sensor may only activate one of the plurality of LED groups in the lighting apparatus 100 if an object is moving above a certain speed, e.g. around the speed limit associated with the street.

Notably, the above embodiment may provide substantial cost savings for street lighting. For example, in rural roads that are infrequently traveled, the lights may remain off until a moving car or object is detected rather than having the lights remain on throughout the light when the street is not in use.

Figure 6:
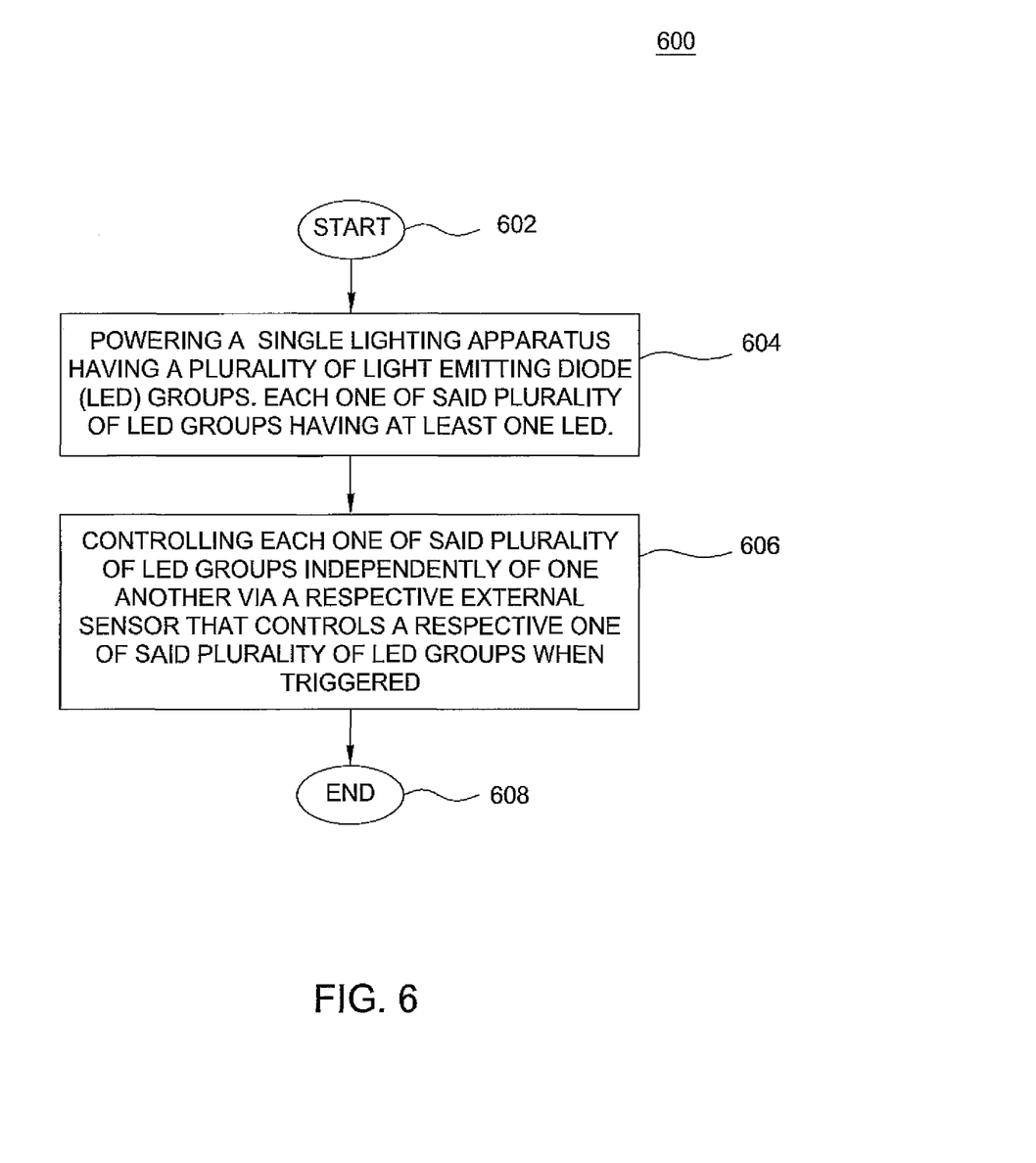
FIG. 6 depicts a flow chart for one embodiment of a method for providing multi-zoned illumination using a single lighting apparatus.

FIG. 6 illustrates one embodiment of a flow chart for a method 600 for providing multi-zoned illumination using a single lighting apparatus. The method 600 begins at step 602.

At step 604, the method 600 powers a single lighting apparatus having a plurality of LED groups, each one of the plurality of LED groups having at least one LED. As discussed above, one embodiment of the present invention only requires a single power source to a single lighting apparatus for illuminating multiple zones.

At step 606, the method 600 controls each one of the plurality of LED groups independently of one another via a respective external sensor that controls a respective one of said plurality of LED groups when triggered. As described above, even though the single lighting apparatus 100 is powered, all of the LEDs in the lighting apparatus 100 need not be all at the same illumination level. Notably, the LEDs may be associated with different LED groups and adjusted or powered on or off independently of the other LED groups. The method 600 concludes at step 608.

While various embodiments have been described above, it should be understood that they have been presented by way of example only, and not limitation. Thus, the breadth and scope of a preferred embodiment should not be limited by any of the above-described embodiments, but should be defined only in accordance with the following claims and their equivalents.

What is claimed is:

1. A multi-zoned lighting apparatus comprising:
   at least one circuit board;
   at least one control circuit coupled to said at least one circuit board; and
   a plurality of light emitting diode (LED) groups coupled to said at least one control circuit, wherein each LED group of said plurality of LED groups is in communication with a respective external sensor, wherein said each LED group of said plurality of LED groups is independently controlled via said respective external sensor in communication with said at least one control circuit when said respective external sensor is triggered to turn on when said respective external sensor detects an object, wherein an illumination level of one of said plurality of LED groups is determined based on a type of object that is detected by said respective external sensor, wherein said type of object is detected based upon a speed of said object or an image recognition of said object, wherein a first illumination level is used when said type of object detected is a person and a second illumination level is used when said type of object detected is a vehicle, wherein the second illumination level is lower than the first illumination level, wherein each one of said plurality of LED groups within a single lighting apparatus illuminates a different zone.

2. The multi-zoned lighting apparatus of claim 1, wherein each one of said plurality of LED groups comprises a plurality of LEDs.

3. The multi-zoned lighting apparatus of claim 1, wherein each LED group of said plurality of LED groups is independently controlled comprises changing an illumination level of one of said plurality of LED groups without changing an illumination level of remaining ones of said plurality of LED groups.

4. The multi-zoned lighting apparatus of claim 3, wherein said illumination level comprises at least one of: an on level, an off level or a gradation of illumination between the on level and the off level.

5. The multi-zoned lighting apparatus of claim 1, wherein each one of said plurality of LED groups provides at least 10 lumens per square meter.

6. The multi-zoned lighting apparatus of claim 1, further comprising:
    a controller coupled to said respective external sensor.

7. The multi-zoned lighting apparatus of claim 1, wherein at least one LED on each one of said plurality of LED groups is coupled to an optic.

8. A method for providing multi-zoned illumination using a single lighting apparatus, comprising:
    powering said single lighting apparatus having a plurality of light emitting diode (LED) groups, each one of said plurality of LED groups having at least one LED; and
    controlling each one of said plurality of LED groups independently of one another via a respective external sensor in communication with a control circuit when said respective external sensor is triggered to turn on when said respective external sensor detects an object, wherein an illumination level of one of said plurality of LED groups is determined based on a type of object that is detected by said respective external sensor, wherein said type of object is detected based upon a speed of said object or an image recognition of said object, wherein a first illumination level is used when said type of object detected is a person and a second illumination level is used when said type of object detected is a vehicle, wherein the second illumination level is lower than the first illumination level, wherein each one of said plurality of LED groups within the single lighting apparatus illuminates a different zone.

9. The method of claim 8, wherein an illumination level of all remaining LEDs of other ones of said plurality of LED groups remains unchanged.

10. A system for providing multiple points of multi-zoned illumination, comprising:
    a plurality of lighting apparatuses, each one of the plurality of lighting apparatuses comprising:
        a plurality of light emitting diode (LED) groups, wherein each LED group of said plurality of LED groups is independently controlled and illuminates a different zone; and
        at least one LED coupled to each one of said plurality of LED groups;
    at least one sensor coupled to each one of said plurality of lighting apparatuses; and
    a central controller remotely located from said plurality of lighting apparatuses and in communication with said plurality of lighting apparatuses, wherein each one of the plurality of LED groups is independently controlled via the at least sensor in communication with said central controller when said at least one sensor is triggered to turn on when said at least one sensor detects an object, wherein an illumination level of one of said plurality of LED groups of one of said plurality of lighting apparatuses is determined based on a type of object that is detected by said at least one sensor, wherein said type of object is detected based upon a speed of said object or an image recognition of said object, wherein a first illumination level is used when said type of object detected is a person and a second illumination level is used when said type of object detected is a vehicle, wherein the second illumination level is lower than the first illumination level.

11. The system of claim 10, wherein each one of said plurality of lighting apparatuses is in communication with one another.

12. The system of claim 11, wherein each one of said plurality of lighting apparatuses communicates with one another via radio frequency (RF).

13. The system of claim 10, further comprising:
    a hub for relaying communications between said central controller and each one of said plurality of lighting apparatuses.

14. The system of claim 13, wherein one or more mobile devices communicate with said plurality of lighting apparatuses via said hub.

\* \* \* \* \*